No. 860,100. PATENTED JULY 16, 1907.
C. MEINECKE.
SYSTEM OF CONTROLLING VALVES FOR WATER METER INSTALLATIONS.
APPLICATION FILED DEC. 12, 1906.
Fig. 1.
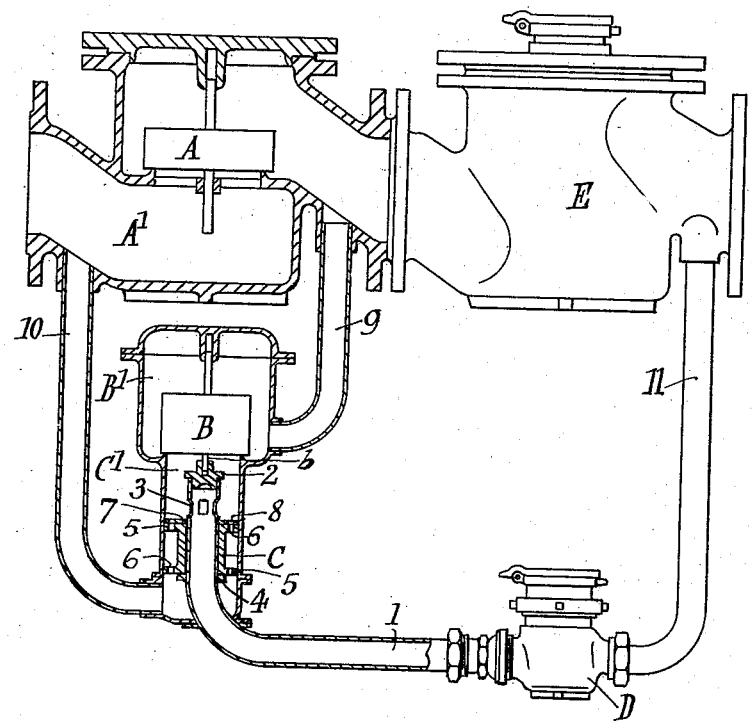
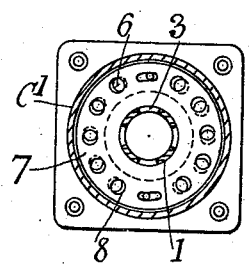
Fig. 2.
Witnesses:
Inventor

UNITED STATES PATENT OFFICE.

CARL MEINECKE, OF BRESLAU, GERMANY, ASSIGNOR TO AKTIEN GESELLSCHAFT VORM. H. MEINECKE, OF BRESLAU-CARLOWITZ, GERMANY.

SYSTEM OF CONTROLLING VALVES FOR WATER-METER INSTALLATIONS.

No. 860,100.     Specification of Letters Patent.     Patented July 16, 1907.

Application filed December 12, 1906. Serial No. 347,492.

*To all whom it may concern:*

Be it known that I, CARL MEINECKE, a subject of the German Emperor, residing at Breslau, Silesia, in the Empire of Germany, have invented a new and Improved System of Controlling Valves for Water-Meter Installations, of which the following is a specification.

The object of this invention is to provide reliable means for water-meter installations for measuring variable water supplies in an accurate and efficient manner.

Large meters connected with the mains fail to register small supplies and it has been necessary to adopt with each large meter a co-acting by-pass meter controlled by a reversing valve; but this arrangement is not sufficiently effective for accurate measuring by reason of the inertia of the large meter in starting and consequent escape through the same of unregistered quantities of water. Correct registration of variable service supplies can only be effected by adopting the more recently applied system of passing the water each time according to consumption either through the large meter, or the by-pass meter alone. However, the imperfect results hitherto attained with this system are due to difficulties in effecting an instantaneous opening and closing of the controlling valve for diverting the flows through anyone of the meters at regular pre-determined service supplies.

It is the object of this invention to obviate the aforementioned difficulties by means of a special system of controlling valves and the particular installation of the combined main meter and by-pass meter, which will be fully described with reference to the accompanying drawings, in which:—

Figure 1 shows the complete installation partly in section; and Fig. 2 shows a regulating device, drawn to a larger scale, of a valve-check or obturator.

The means for automatically diverting the flow either through the main meter or through the by-pass meter according to the momentary service requirements, consists essentially of three independent controlling valves A, B and C. The sliding drum-valve C may, if desired, be mounted in the same chamber with either or with both of the former. In the arrangement as shown by way of an example in these drawings, the valves B and C are mounted in communicating chambers $B^1$ & $C^1$ respectively. The pipe 1 (leading to the by-pass meter D) is mounted concentrically within the chamber $C^1$; it is closed at its upper end 2 and has lateral inlets or ports 3 for the water. The upper end of the pipe 1 provides a guide socket for a lower stem $b$ of the intermediate valve B and on the pipe itself is mounted the sliding differential- or drum- valve C adapted to move vertically in the chamber $C^1$ but normally resting on a collar 4. The valve C has a rim or flange 5 at each end fitting the valve chamber and having holes 6. The upper flange 5 carries an annular check plate or obturator 7 formed with holes 8 corresponding to the holes 6 as is more clearly shown in Fig. 2. The plate 7 is adapted to be turned so as to more or less obturate the holes 6 in the flange 5 of the valve for the purpose of regulating the passage of water and so adjust the valve motion for a predetermined pressure. In some instances it may be advantageous to provide a similar obturating ring for the lower flange of the valve C.

From the chamber $B^1$ an egress pipe 9 returns into the main service pipe between the large meter and the high pressure valve A, while a pipe 10 brings the water from the main in front of the latter to the lower part of the chamber $C^1$ and a pipe 11 connects the by-pass meter D with the rear of the large meter E.

The action is as follows:—During reduced flows of consumption, the water is unable to lift the pressure valve A and therefore passes from the valve chamber $A^1$ through the pipe 10 beneath the differential valve C, then rises through the perforated flanges of the latter and escapes through the ports 3 in the pipe 1 to the small meter D and finally through the egress pipe 11 onto the main service pipe at the rear of the large meter E. When the consumption increases, there will be a corresponding difference of pressure at the top and bottom of the valve C and finally the excess of pressure below will be sufficient to overcome the weight of the valve and move it suddenly upward thereby closing the ports 3. At the same time the rapidly increasing pressure beneath the intermediate valve B lifts the latter and the flow takes place straight upward through the pipe 9 into the large meter E which immediately starts registering. As a further increase in the consumption would tend to create a vacuum above the pressure valve A the latter will then be forced open by the ensuing strong flow and so delivers direct into the large meter. With reduced consumption, the action takes place in a reversed but similar manner. The valve A by reason of its superior weight closes first and the water supply then passes only through the pipes 10 and 9 to the large meter. A further reduction of flow then produces a modification of pressure beneath the valve C and allows the same to fall by its weight so as to open the ports 3, thereby diverting the flow towards the small meter. In consequence hereof the pressure is no longer sufficient to keep the valve B lifted and the latter immediately closes the supply to the large meter.

In order to permit of accurately adjusting the reversing motion of the valve C and the flow from one meter to the other for a pre-determined service supply, it is necessary to provide the said valve with the throttle ring or check placed over the upper flange of the valve, and which is turned so as to partly cover the holes 6 in the valve and thus to check the flow of the water, thereby varying the pressure above and below the valve in accordance with the required service supply.

What I claim and wish to secure by Letters Patent of the United States, is:—

1. In a system of controlling valves for water meter installations; the combination with the main and the large meter and by-pass meter, of a differential valve, a valve chamber therefor, an ingress pipe between the main and said chamber, an egress pipe from the latter to the by-pass meter, an intermediate valve seated at the upper end of said chamber, an enlarged chamber for said intermediate valve, an egress pipe from said enlarged chamber to the inlet of the large meter, a pipe from the by-pass meter to the rear end of the large meter, and a high pressure valve and valve chamber in the main between the ingress pipe of the intermediate valve, as set forth.

2. In a system of controlling valves for water meter installations, the combination with the main and its large meter, high pressure valve and by-pass meter, of a lower chamber communicating with the main, a differential valve sliding vertically within said chamber, an intermediate valve and superposed chamber above the differential valve and communicating therewith, a pipe leading from the superposed chamber to the high pressure valve chamber, an upwardly bent egress pipe with closed end within the differential valve chamber to carry said differential valve, ports in said pipe for obturation by said valve, communication between said egress pipe and the by-pass meter, and a pipe from the latter to the rear of the large meter, as set forth.

3. In a system for controlling valves for water meter installations herein referred to, a differential valve-chamber an internal upright egress pipe with ports near its upper end and a supporting collar near its lower part within and concentric to said chamber and leading externally to the by-pass meter, a pipe from the latter to the rear of the large meter, a differential valve mounted slidably upon the inner part of said egress pipe, a perforated flange at each end of said valve to fit the chamber, a perforated throttle ring fitted over the upper flange, a mounting fixed to the upper end of said egress pipe, a socket formed in said mounting, an intermediate valve seated on the upper edge of said chamber, a stem to the intermediate valve to engage in said socket, an enlarged valve chamber for the intermediate valve, a delivery pipe from such chamber to the fore-end of the large meter, and an independent high pressure valve and valve chamber connected therewith.

CARL MEINECKE.

Witnesses:
 ERNST KATZ,
 ERNST BLEISCH.